(No Model.)

T. CURLEY.
LEMON JUICE EXTRACTOR.

No. 465,244. Patented Dec. 15, 1891.

Witnesses:
Frank C. Curtis
John T. Booth

Inventor:
Thomas Curley
by Geo. A. Mosher
Atty.

UNITED STATES PATENT OFFICE.

THOMAS CURLEY, OF TROY, NEW YORK.

LEMON-JUICE EXTRACTOR.

SPECIFICATION forming part of Letters Patent No. 465,244, dated December 15, 1891.

Application filed February 25, 1891. Serial No. 382,724. (No model.)

*To all whom it may concern:*

Be it known that I, THOMAS CURLEY, a citizen of the United States, residing at Troy, county of Rensselaer, and State of New York, have invented certain new and useful Improvements in Lemon-Juice Extractors, of which the following is a specification.

My invention relates to such improvements; and it consists of the novel construction and combination of parts hereinafter described and subsequently claimed.

Reference may be had to the accompanying drawings and the letters of reference marked thereon, which form a part of this specification.

Similar letters refer to similar parts in the several figures therein.

Figure 1:
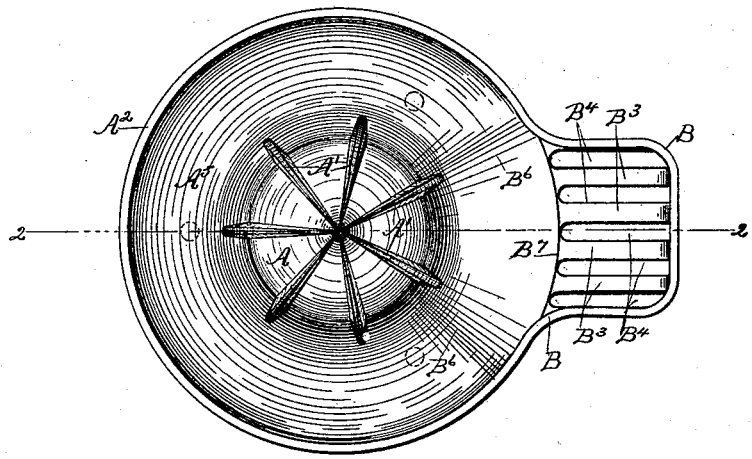
Figure 2:
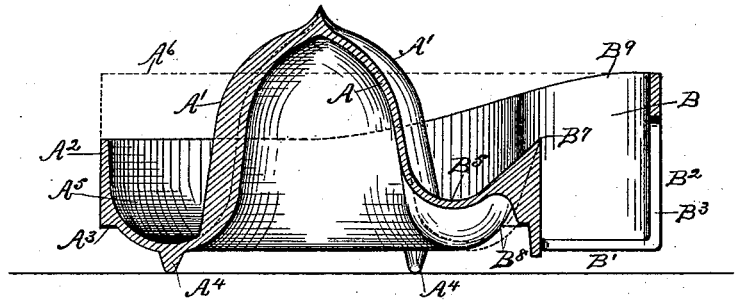

Figure 1 of the drawings is a top plan view of my improved lemon-juice extractor. Fig. 2 is a central vertical section of the same, taken on the broken line 2 2 in Fig. 1.

My invention relates more especially to that class of extractors having a ribbed cone or dome surrounded at its base by a saucer-like reservoir integral therewith and adapted to receive the juice, pulp, and seeds which are extracted from the rind by the rib-like projections on the cone.

The object of the invention is to provide a strainer integral with the saucer-like base for separating the juice from the pulp and seeds.

A is the cone, which is partly dome-shaped and provided with the extracting-ribs $A'$, which may be of any known form. The cone is surrounded by the saucer-shaped base $A^2$, having a flange $A^3$, adapted to rest upon the upper edge of a cup or tumbler, also with legs $A^4$ for supporting the device when removed from the tumbler. An annular reservoir $A^5$ is formed between the cone and the outer rim of the base. Projecting from one side of the base is the well B, having a strainer in the bottom $B'$ and side $B^2$, formed by the bars $B^3$, having the openings $B^4$ between them.

The bottom part of the saucer-shaped base directly opposite the strainer is raised or uplifted, as shown in Fig. 2 at $B^5$ and in Fig. 1 by the radial shade lines $B^6$, so as to lessen the depth of the reservoir at that point. The contents of the reservoir are discharged at such part over the edge $B^7$ into the strainer by tipping the device until the contents have run from the reservoir into the strainer. It is obvious that the device does not require to be tipped so far to discharge its contents if the bottom of the reservoir is raised on the discharge side, as would be necessary if the reservoir were of uniform depth, as indicated by the dotted lines $B^8$. The upper outer edge $B^9$ of the base is also raised on the discharge side of the device to form a passage-way leading from the reservoir over the edge $B^7$ into the strainer, as shown in Fig. 2. When desired, the edge may be raised all the way around the base, as indicated by the dotted lines $A^6$.

I am thus able to cheaply provide a strainer which is always conveniently at hand, being integral with the cone and reservoir, and which is so situated as not to interfere with the operation of the extractor, and the less the degree of inclination it is desired to give the device to empty the reservoir the less the height it is necessary to give the edge wall $B^9$, leading to and around the strainer to prevent the contents from escaping over the same while discharging such contents from the reservoir into the strainer.

What I claim as new, and desire to secure by Letters Patent, is—

1. A lemon-juice extractor consisting of a reservoir-base, a cone extractor, a strainer located outside of the reservoir, and a passage-way leading from the reservoir to the strainer, substantially as described.

2. A lemon-juice extractor consisting of a reservoir-base, a cone extractor, a strainer outside of the base and connected with it by a raised flange, forming a passage-way leading from the reservoir to the strainer, and a raised bottom portion in the reservoir at the mouth of such passage-way, substantially as described.

3. A lemon-juice extractor consisting of a cone extractor, a reservoir-base, an outlet passage-way from the reservoir, and a raised bottom portion in the reservoir at the mouth of the outlet passage-way, substantially as described.

In testimony whereof I have hereunto set my hand this 24th day of February, 1891.

THOMAS CURLEY.

Witnesses:
FRANK C. CURTIS,
CHAS. L. ALDEN.